United States Patent [19]
Saito et al.

[11] Patent Number: 5,487,059
[45] Date of Patent: Jan. 23, 1996

[54] HEAT SHUT OFF CONDITION DETERMINATION METHOD AND APPARATUS FOR OPTICAL RECORDING, AND OPTICAL RECORDING METHOD AND APPARATUS

[75] Inventors: Jun Saito, Tokyo; Shinichi Kurita, Yokohama, both of Japan

[73] Assignee: Nikon Corporation, Tokyo, Japan

[21] Appl. No.: 137,967

[22] Filed: Oct. 19, 1993

[30] Foreign Application Priority Data

Oct. 20, 1992 [JP] Japan .................. 4-281723

[51] Int. Cl.⁶ .................. G11B 11/12; G11B 13/04
[52] U.S. Cl. .................. 369/116; 369/13; 369/59
[58] Field of Search .................. 369/116, 54, 13, 369/59, 121, 100; 360/59, 60, 61, 62

[56] References Cited

U.S. PATENT DOCUMENTS

| | | | |
|---|---|---|---|
| 4,843,604 | 6/1989 | Fujiwara et al. | 369/116 |
| 4,894,816 | 1/1990 | Sukeda et al. | 369/54 |
| 4,938,915 | 7/1990 | Saito | 369/116 X |
| 4,972,337 | 11/1990 | Eguchi et al. | 369/13 |
| 5,163,031 | 11/1992 | Osato | 369/13 |
| 5,323,374 | 6/1994 | Arai et al. | 369/116 |
| 5,339,298 | 8/1994 | Saito | 369/13 |

FOREIGN PATENT DOCUMENTS

| | | |
|---|---|---|
| 0458975 | 12/1991 | European Pat. Off. . |
| 0477892 | 4/1992 | European Pat. Off. . |
| 3804240 | 8/1988 | Germany . |

OTHER PUBLICATIONS

Patent Abstracts of Japan, vol. 14, No. 569 (P-1144) 18 Dec. 1990 (JP-A-02 244 443).

Patent Abstracts of Japan, vol. 11, No. 178 (P-584) 9 Jun. 1987 (JP-A-62 008 371).

Standard ECMA/TC31/92/36, European Computer Manufacturers Association, 3rd Draft Proposal, Sep. 1992, "Information Interchange on Second Generation 130 mm Optical Disk Cartridges, Rewritable and Worm, Using the Magneto-Optical Effect, and Read Only" (two pages).

Primary Examiner—Aristotelis Psitos
Assistant Examiner—Thang V. Tran
Attorney, Agent, or Firm—Shapiro and Shapiro

[57] ABSTRACT

In an optical recording method and apparatus, the intensity of a laser beam to be radiated onto a magnetooptical recording medium is raised from an intensity $P_{pre}$ for maintaining a pre-heat state, in which the temperature on the medium surface has a predetermined temperature $\Theta_{pre}$, to an intensity $P_{W1}$ higher than $P_{pre}$ so as to form a mark on the medium, the intensity is reduced to an intensity $P_{LB}$ lower than $P_{pre}$, and after an elapse of a time $T_{off}$, the intensity is raised to $P_{pre}$. At least one of $P_{pre}$, $T_{off}$ and $P_{LB}$ is controlled to achieve the pre-heat state within a time period until the intensity is raised to $P_{W1}$ again to form the next mark.

12 Claims, 12 Drawing Sheets

HEAT SHUT OFF CONDITION DETERMINATION METHOD AND APPARATUS FOR OPTICAL RECORDING, AND OPTICAL RECORDING METHOD AND APPARATUS

BACKGROUND OF THE INVENTION

1. Field of the Invention

The present invention relates to a heat shut off condition determination method and apparatus for optical recording and an optical recording method and apparatus.

2. Related Background Art

At present, optical recording is achieved by exclusively utilizing a thermal nature of a laser beam, and recording media (optical disks) include (1) a write-once type optical disk (pit formation type) allowing recording only once, such as an optical disk having a thin metallic film or thermet film as a recording layer, and (2) an optical disk which allows repeated recording, reproduction, and erasure, such as a magnetooptical disk having a magnetic thin film as a recording layer, a phase-change optical disk having a metallic film or thermet film as a recording layer, which film causes a phase change between crystal and amorphous phases, and the like.

Several ten thousands of tracks on which information is to be recorded are spirally or concentrically formed on an optical disk. Two types of information units corresponding to "0" and "1" are formed on each track, thereby recording information. In practice, the track itself (i.e., a background portion) indicates a first information unit corresponding to one of "0" and "1", and second information units (called marks, recently) corresponding to the other one of "0" and "1" are formed on the track in a point or island pattern. In this case, the presence/absence of marks, the mark interval, the mark length, the mark formation start position (i.e., the leading edge position of a mark), the mark formation end position (i.e., the trailing edge position of a mark), and the like express information. In particular, a method of expressing information by the edge position of a mark is called mark length recording.

An optical recording apparatus is mainly constituted by a laser source, a radiation optical system for radiating a laser beam emitted from the laser source onto an optical disk, modulation means for modulating the laser beam intensity according to information to be recorded, and optical disk rotation means. In a magnetooptical recording apparatus, magnetic means for applying a bias magnetic field to the radiation position of the beam is added.

Since optical recording exclusively utilizes a thermal nature of a laser beam (heat mode), the laser beam intensity need only be pulse-modulated between a relatively high first level and a relatively low base level (second level) in principle. When the laser beam intensity is at the first level, a mark is formed; when it is at the second level, no mark is formed. That is, one mark is formed in correspondence with one pulse. The second level can be zero since it does not form any mark. However, when a mark is to be formed, in other words, when the leading edge of a mark is to be formed, it is preferable that the disk temperature state immediately before formation be always positively maintained in a constant temperature state. Otherwise, the leading edge position varies depending on the temperature state immediately before formation. Such a variation disturbs high-density recording. Thus, it is preferable that an optical disk be pre-heated to a predetermined temperature $\Theta_{pre}$, i.e., be set in a pre-heat state, and the second level be normally set at an intensity $P_{pre}$ for maintaining this pre-heat state (temperature $\Theta_{pre}$). The temperature $\Theta_{pre}$ allows the disk temperature immediately before mark formation to be constant independently of the peak temperature position of the beam or the data pattern recorded at the spot center position, and $P_{pre}$ is given by the following formula:

$$\Theta_{pre}=A \times P_{pre} \times \{1-exp(-\infty/\tau)\}+\Theta A \qquad \text{(formula 1)}$$

where A (°C./mW) is the heat efficiency of the laser beam intensity determined by the disk, the spot, and the recording line density, and $\Theta A$ (°C.) is the disk temperature in a non-radiation state of the beam.

The first mark formation is a method of forming one mark in correspondence with one pulse. FIG. 11 is a waveform chart of the laser beam intensity when one mark is formed by the first method. As shown in FIG. 11, a pulse waveform for raising the laser beam intensity from the base level (second level) $P_{pre}$ to start mark formation, and after the raised intensity (first level) $P_{W1}$ is maintained for a time $T_{W1}$ by a half-width, reducing the intensity to $P_{pre}$ is used. In this case, when the mark length is large, an adverse effect due to heat accumulation appears. The adverse effect is that even when the laser beam intensity is reduced to $P_{pre}$ to end mark formation, the medium temperature cannot be easily decreased to the mark formation start temperature or less due to the heat accumulation so far. For this reason, the mark length or width becomes unexpectedly large. This adverse effect is called "recording data pattern dependency of the mark formation end position, i.e., the mark trailing edge position". This dependency disturbs high-density recording, and decreases identifiability of data.

The second mark formation method can solve this problem to some extent. FIG. 12 is a waveform chart of the laser beam intensity when one mark is formed by the second method. As shown in FIG. 12, the intensity of the laser beam to be radiated onto the optical recording medium is raised from $P_{pre}$ to an intensity $P_{W1}$ higher than $P_{pre}$, and after $P_{W1}$ is maintained for a time $T_{W1}$, the intensity is reduced to an intensity $P_{LT}$ lower than $P_{W1}$. Thereafter, the intensity is modulated between $P_{LT}$ and an intensity $P_{W2}$ higher than $P_{LT}$. The time for maintaining $P_{W2}$ is $T_{W2}$, and the modulation period upon intensity modulation between $P_{LT}$ and $P_{W2}$ is $T_p$. This method is called a pulse train method since a waveform (see FIG. 11) which originally consists of one pulse consists of a small start pulse, and one or two or more following small pulses. In this case, the temperature at the laser beam radiation position on the optical disk during mark formation normally drifts up and down near a high temperature.

On the other hand, in the case of high-density recording, the start position of the next mark undesirably varies depending on the end position of the immediately preceding mark. This phenomenon is called "recording data pattern dependency of the mark formation start position, i.e., the mark leading edge position". In order to solve this problem, an optical recording method for, when the laser beam intensity is reduced to end mark formation, temporarily reducing the intensity to $P_{LB}$ lower than $P_{pre}$, and after an elapse of a time $T_{off}$ raising the intensity to $P_{pre}$ has been proposed. FIGS. 9 and 10 are waveform charts of the laser beam intensity when one mark is formed by this method. FIG. 9 shows a case wherein one mark is formed in correspondence with one pulse, and FIG. 10 shows a case wherein a mark is formed by the pulse train method. In this method, formation of the next mark is started from a predetermined position regardless of the length of the immediately preceding mark. In this manner, a thermal influence from the immediately preceding mark is shut off for the next mark. A condition for shutting off the thermal influence in this manner is called a "heat shut off condition", and is expressed by $P_{pre}$, $P_{LB}$, and $T_{off}$. Conventionally, in the heat shut off condition, as described in STANDARD ECMA/TC31/92/36 3rd Draft Proposal, p. 87 (see FIG. 13), European Computer Manufacturers Association (to be abbreviated to ECMA hereinafter), $P_{LB}$ is fixed at a laser beam intensity $P_r$ in a reproduction mode, and $T_{off}$ is fixed to a write clock period T.

SUMMARY OF THE INVENTION

The above-described prior art suffers from a problem of an unexpected decrease in identifiability of data depending on an optical disk to be used in high-density recording. It is an object of the present invention to solve this problem.

According to the extensive studies of the present inventors, when the laser beam intensity decreases from $P_{W1}$ or $P_{W2}$, and reaches $P_{pre}$ via $P_{LB}$, the temperature of an optical disk decreases from a high temperature (to be referred to as $\Theta_{top}$ hereinafter) capable of performing mark formation, and then becomes constant at the temperature $\Theta_{pre}$ in the preheat state. In this case, there are two types of decreased temperature profiles.

In the first decreased temperature profile, the temperature monotonously decreases from $\Theta_{top}$ to $\Theta_{pre}$, and becomes constant. In the second decreased temperature profile, the temperature decreases from $\Theta_{top}$ to a temperature below $\Theta_{pre}$ temporarily, then increases from the temperature below $\Theta_{pre}$ to $\Theta_{pre}$, and then becomes constant. In either profile, the start position of the next mark formation, i.e., the leading edge position of the next mark cannot be formed at a desired position unless the temperature of the optical disk is constant at $\Theta_{pre}$. In either profile, a time from when the temperature decreases from $\Theta_{top}$ until it becomes constant at $\Theta_{pre}$ will be referred to as $T_{tc}$ hereinafter.

When the next mark is formed before an elapse of the time $T_{tc}$ the leading edge position of the next mark undesirably has recording date pattern dependency, and data identifiability decreases. Thus, the next mark is formed after an elapse of the time $T_{tc}$. In this case, if the time $T_{tc}$ is long, the interval to the next mark increases, and the recording density becomes low.

A condition for shortening $T_{tc}$ can be considered as a heat shut off condition. The present inventors made extensive studies, and found that the above-mentioned problem is caused by a fixed heat shut off condition regardless of optical disks, and an optimal heat shut off condition is not established for some optical disks.

FIG. 14 is a graph showing a change in temperature of the spot center of the laser beam or a change in peak temperature as time elapses when a mark is formed by the pulse train method and the heat shut off method. Under an insufficient heat shut off condition, a decreased temperature profile indicated by a one dash line in FIG. 14 is obtained, resulting in long $T_{tc}$. Under an excessive heat shut off condition, a decreased temperature profile indicated by a two dash line in FIG. 14 is obtained, resulting in long $T_{tc}$ as well. Under an optimal heat shut off condition, a decreased temperature profile indicated by a full line in FIG. 14 is obtained, resulting in a shortest $T_{tc}$. When recording at a higher density is executed under a non-optimal heat shut off condition, recording data pattern dependency of the leading edge position appears, and data identifiability deteriorates.

The present inventors made further extensive studies, and invented a method of determining an optimal heat shut off condition for different optical disks. Also, the present inventors invented a method and apparatus for performing optical recording using the determined heat shut off condition.

More specifically, according to a first aspect of the invention, there is provided an optical recording method, in which the intensity of a laser beam to be radiated on an optical recording medium is raised from an intensity $P_{pre}$ for maintaining a pre-heat state, in which the temperature of the medium surface becomes a predetermined temperature $\Theta_{pre}$, to an intensity $P_{W1}$ higher than $P_{pre}$ so as to form a mark on the medium surface, is thereafter reduced to an intensity $P_{LB}$ lower than $P_{pre}$, and is then raised to $P_{pre}$ after an elapse of a time $T_{off}$, wherein at least one of $P_{pre}$, $T_{off}$, and $P_{LB}$ is controlled to attain the pre-heat state within a time period until the intensity is raised to $P_{W1}$ again to form the next mark.

According to a second aspect of the invention, there is provided the optical recording method, wherein thermal response characteristics of the optical recording medium can be approximated by an exponential function.

According to a third aspect of the invention, there is provided an optical recording method, in which the intensity of a laser beam to be radiated onto an optical recording medium is raised from an intensity $P_{pre}$ for maintaining a pre-heat state, in which the temperature of the medium surface becomes a predetermined temperature $\Theta_{pre}$, to an intensity $P_{W1}$ higher than $P_{pre}$ so as to form a mark on the medium surface, after the intensity $P_{W1}$ is maintained for a time $T_{W1}$, the intensity is reduced to an intensity $P_{LB}$ lower than $P_{pre}$, and after an elapse of a time $T_{off}$, the intensity is raised to $P_{pre}$, wherein the respective values are determined as a combination for satisfying the following formula 2:

$$T_{off} = \tau \times \ln[\{(P_{W1}-P_{LB})-(P_{W1}-P_{pre}) \times \exp(-T_{W1}/\tau)\} + (P_{pre}-P_{LB})]$$

(formula 2)

($\tau$ is a thermal time constant of the optical recording medium).

According to a fourth aspect of the invention, the intensity $P_{LB}$ is set to be zero in the method according to any one of the first, second, and third aspects of the invention.

According to a fifth aspect of the invention, the time $T_{off}$ is set to be equal to or close to a value m/n times (m and n are natural numbers) of a write clock period T in the method according to any one of the first, second, and third aspects of the invention.

According to a sixth aspect of the invention, there is provided an optical recording apparatus comprising a laser source for emitting a laser beam, radiation means for radiating the laser beam onto an optical recording medium, moving means for changing a radiation position of the laser beam on the medium, modulation means for raising an intensity of the laser beam to be radiated onto the medium from an intensity $P_{pre}$ for maintaining a pre-heat state, in which the temperature of the medium surface becomes a predetermined temperature $\Theta_{pre}$, to an intensity $P_{W1}$ higher than $P_{pre}$ so as to form a mark, reducing the intensity to an intensity $P_{LB}$ lower than $P_{pre}$, and after an elapse of a time $T_{off}$, raising the intensity to $P_{pre}$, and control means for controlling at least one of $P_{pre}$, $T_{off}$, and $P_{LB}$ so that the pre-heat state is established within a time period until the intensity is raised to $P_{W1}$ again to form the next mark.

According to a seventh aspect of the invention, there is provided an optical recording apparatus comprising a laser source for emitting a laser beam, radiation means for radiating the laser beam onto an optical recording medium, moving means for changing a radiation position of the laser beam on the medium, modulation means for raising an intensity of the laser beam to be radiated onto the medium from an intensity $P_{pre}$ for maintaining a pre-heat state, in which the temperature of the medium surface becomes a predetermined temperature $\Theta_{pre}$, to an intensity $P_{W1}$ higher than $P_{pre}$ so as to form a mark, reducing the intensity to an intensity $P_{LB}$ lower than $P_{pre}$ after the intensity $P_{W1}$ is maintained for a time $T_{W1}$, and raising the intensity to $P_{pre}$ after an elapse of a time $T_{off}$, and condition determination means for determining the respective values as a combination for satisfying formula 2.

According to an eighth aspect of the invention, the intensity $P_{LB}$ is set to be zero in the apparatus according to the sixth or seventh aspect of the invention.

According to a ninth aspect of the invention, the time $T_{off}$ is set to be equal to or close to a value m/n times (m and n are natural numbers) of a write clock period T in the apparatus according to the sixth aspect of the invention.

According to a tenth aspect of the invention, there is provided in a method of determining a condition for an optical recording method, in which the intensity of a laser beam to be radiated on an optical recording medium is raised from an intensity $P_{pre}$ for maintaining a pre-heat state, in which the temperature of the medium surface becomes a predetermined temperature $\Theta_{pre}$, to an intensity $P_{W1}$ higher than $P_{pre}$ so as to form a mark on the medium surface, is thereafter reduced to an intensity $P_{LB}$ lower than $P_{pre}$, and is then raised to $P_{pre}$ after an elapse of a time $T_{off}$, a method of determining a heat shut off condition for optical recording wherein a combination of $P_{pre}$, $T_{off}$ and $P_{LB}$ is determined to establish the pre-heat state within a time period until the intensity is raised to $P_{W1}$ again to form the next mark.

According to an eleventh aspect of the invention, there is provided in a method of determining a condition for an optical recording method, in which the intensity of a laser beam to be radiated onto an optical recording medium is raised from an intensity $P_{pre}$ for maintaining a pre-heat state, in which the temperature of the medium surface becomes a predetermined temperature $\Theta_{pre}$, to an intensity $P_{W1}$ higher than $P_{pre}$ so as to form a mark on the medium surface, after the intensity $P_{W1}$ is maintained for a time $T_{W1}$, the intensity is reduced to an intensity $P_{LB}$ lower than $P_{pre}$, and after an elapse of a time $T_{off}$, the intensity is raised to $P_{pre}$, a method of determining a heat shut off condition for optical recording, wherein the respective values are determined as a combination for satisfying formula 2.

According to a twelfth aspect of the invention, the intensity $P_{LB}$ is set to be zero in the method according to the tenth or eleventh aspect of the invention.

According to a thirteenth aspect of the invention, the time $T_{off}$ is set to be equal to or close to a value m/n times (m and n are natural numbers) of a write clock period T in the method according to the tenth or eleventh aspect of the invention.

According to a fourteenth aspect of the invention, there is provided in an apparatus for determining a condition for an optical recording method, in which the intensity of a laser beam to be radiated on an optical recording medium is raised from an intensity $P_{pre}$ for maintaining a pre-heat state, in which the temperature of the medium surface becomes a predetermined temperature $\Theta_{pre}$, to an intensity $P_{W1}$ higher than $P_{pre}$ so as to form a mark on the medium surface, is, thereafter, reduced to an intensity $P_{LB}$ lower than $P_{pre}$, and is then raised to $P_{pre}$ after an elapse of a time $T_{off}$, an apparatus for determining a heat shut off condition for optical recording, comprising a calculation unit for calculating a combination of $P_{pre}$, $T_{off}$ and $P_{LB}$, which combination establishes the pre-heat state within a time period until the intensity is raised to $P_{W1}$ again to form the next mark, and an output unit for outputting values calculated by the calculation unit.

According to a fifteenth aspect of the invention, there is provided in an apparatus for determining a condition for an optical recording method, in which the intensity of a laser beam to be radiated onto an optical recording medium is raised from an intensity $P_{pre}$ for maintaining a pre-heat state, in which the temperature of the medium surface becomes a predetermined temperature $\Theta_{pre}$, to an intensity $P_{W1}$ higher than $P_{pre}$ so as to form a mark on the medium surface, after the intensity $P_{W1}$ is maintained for a time $T_{W1}$, the intensity is reduced to an intensity $P_{LB}$ lower than $P_{pre}$, and after an elapse of a time $T_{off}$, the intensity is raised to $P_{pre}$, an apparatus for determining a heat shut off condition for optical recording, comprising a calculation unit for calculating the respective values as a combination for satisfying formula 2, and an output unit for outputting the values calculated by the calculation unit.

According to a sixteenth aspect of the invention, the intensity $P_{LB}$ is set to be zero in the apparatus according to the fourteenth or fifteenth aspect of the invention.

According to a seventeenth aspect of the invention, the time $T_{off}$ is set to be equal to or close to a value m/n times (m and n are natural numbers) of a write clock period T in the apparatus according to the fourteenth or fifteenth aspect of the invention.

The general principle of the above-described methods and apparatuses will be described hereinafter.

The thermal time constant τ will be explained below.

FIG. 3 includes an example (a) of a pattern (waveform) of a data signal to be recorded, a chart (a chart of electric power to be input to a laser source) (b) showing a light-emission intensity $P_1$ and a light-off intensity $P_0$ of the laser beam at that time, a temperature profile (elevated temperature profile) (c) of the disk at that time, and an explanatory view (d) showing the relationship of marks to be formed.

When optical recording is performed on an optical disk using a recording laser beam (pulse), optical disks are classified into two types, i.e., heat-insulation disks and heat-diffusion disks in terms of heat diffusion. Assume that a laser beam is raised from the light-off intensity to the light-emission intensity in a step-function pattern (like a rectangular wave), as shown in (b) in FIG. 3, in accordance with a data signal ((a) in FIG. 3). Since the heat-insulation disk tends to accumulate heat as compared to the heat-diffusion disk, a temperature elevation [°C./mW] per unit intensity of the laser beam, i.e., A in formula 1 is large. More specifically, when the laser beam is radiated at the same intensity for a long period of time, the temperature saturation level of the heat-insulation disk is higher than that of the heat-diffusion disk. On the other hand, the heat-insulation disk requires a longer time until the instantaneous (elevated) temperature profile or temperature profile is saturated than that of the heat-diffusion disk. FIG. 4 is a graph showing the temperature profile showing a time ($t_{sat}$) required until the temperature is saturated. More specifically, the heat-insulation disk has longer $t_{sat}$ in FIG. 4 than that of the heat-diffusion disk. This can be easily understood from the fact that an earthen teapot is harder to warm up and to cool down than an iron kettle is. The thermal time constant τ corresponds to $t_{sat}$. More specifically, a disk having long $t_{sat}$ has large τ.

One of the present inventors made extensive studies, and invented a method of measuring the thermal time constant of a disk by measuring an optical disk itself in advance. This measurement method will be explained below.

<Thermal Time Constant Measurement Method>

An optical disk to be measured, and an optical recording/reproduction apparatus for evaluating an optical disk (to be also referred to as an evaluation drive hereinafter) are prepared. A laser beam has N.A.=0.55, and a wavelength= 830 nm, and both the rising and falling times of the laser beam are about 5 nsec. The optical disk is set on the evaluation drive, and is rotated so that the track of the disk has a measurement linear velocity (V=11.3 m/sec). The laser beam spot of the evaluation drive is radiated on the track under the servo control. More specifically, focusing and tracking servo devices are operated. Then, the laser beam is pulse-modulated. Upon radiation of the laser beam, the disk temperature is elevated. In this case, pulse modulation is performed to have a duty cycle, which can assure a time interval long enough not to cause interference of heat generated by heating of pulses. Pulses having various pulse duration times (to be abbreviated as P.D.T. hereinafter) are radiated onto the disk, and a "minimum power ($P_{th}$) capable of performing recording on the disk" of each P.D.T. is obtained. FIG. 5 is a waveform chart for explaining the P.D.T. FIG. 5 shows that a laser beam pulse is radiated on the disk with the "minimum power ($P_{th}$) capable of performing recording on the disk". FIG. 6 is a graph wherein data are plotted while the ordinate represents $P_{th}$, and the abscissa represents P.D.T. As shown in FIG. 6, $P_{th}$ decreases as P.D.T. is prolonged, and converges to a predetermined level $P_0$ after P.D.T reaches a certain value.

Then, as shown in FIG. 7, data are plotted while the ordinate represents a reciprocal number of a value obtained by normalizing $P_{th}$ with $P_0$, i.e., $P_0/P_{th}$, and the abscissa represents P.D.T. This graph represents a thermal response function in an elevated temperature state obtained when the laser beam is radiated onto the disk. Also, as shown in FIG. 8, when the ordinate represents $1-P_0/P_{th}$, the graph represents a thermal response function in a decreased temperature state obtained when the laser beam is turned off. When the thermal response function shown in FIG. 8 can be approximated to an exponential function $\exp(-t/\tau)$, $\tau$ represents the thermal time constant of the temperature elevation/decrease, by the measured laser beam, of the measured optical disk at the measured linear velocity (V).

Under the conventional fixed heat shut off condition ($P_{LB}=P_r$, $T_{off}=T$), the optimal condition for obtaining the shortest $T_{tc}$ shown in FIG. 14 cannot be obtained, and time required until the pre-heat state reaches a steady state is long. In particular, in the case of a disk having a large thermal time constant $\tau$, this influence is conspicuous, and for this reason, the next mark formation position tends to strongly depend on the immediately preceding mark. However, when a heat shut off condition determined by substituting $\tau$ in formula 2 below according to the present invention is used, $T_{tc}$ shown in FIG. 14 becomes minimum at $P_{LB}$:

(formula 2)
$$T_{off}=\tau\times\ln[\{(P_{w1}-P_{LB})-(P_{w1}-P_{pre})\times \exp(-T_{w1}/\tau)\}+(P_{pre}-P_{LB})]$$

($\tau$ is a thermal time constant of the optical recording medium).

This fact was found for the first time by the present inventors. When the determined heat shut off condition is used, the next mark formation position (in other words, the leading edge position of the next mark) can be a predetermined position all the time independently of the immediately preceding mark. This means that since recording data pattern dependency can be removed, high-density recording can be performed accurately, and an unexpected decrease in identifiability of data can be prevented.

Furthermore, the present inventors also found that $T_{tc}$ shown in FIG. 14 becomes minimum as an absolute value under a heat shut off condition in which $P_{LB}$ is zero in formula 2. Therefore, $P_{LB}$ is preferably set to be zero.

Also, the time $T_{off}$ is preferably set to be equal to or close to a value m/n times (m and n are natural numbers) of a write clock period T.

The present invention is particularly effective for an optical disk which has a thermal time constant $\tau$ of 30 nsec or more at V=11.3 m/sec. Also, the present invention is effective for an optical disk satisfying $\tau>T$.

The heat shut off condition given by formula 2 can be applied to only a case wherein the thermal response characteristics of a disk can be approximated by a simple exponential function $\exp(-t/\tau)$. When the thermal response characteristics cannot be approximated by a simple exponential function, the thermal response function is assumed as a function $f(t)$ of time, and is considered as follows.

If we let $t=0$ be time after a heat shut off process is performed for the time $T_{off}$, and the laser beam intensity is raised to $P_{pre}$ again, and F0 be the disk temperature at that time (the temperature is expressed as a time function of intensity since it is proportional to the laser beam intensity), F0 is given by:

$$F0 = P_{pre} \cdot f(T_{w1}+T_{off}) + P_{w1} \cdot \{f(T_{off})-f(T_{w1}+T_{off})\} + P_{LB} \cdot \{1-f(T_{off})\}$$

A disk temperature Fnx after an elapse of time $t=nx$ (x is an arbitrary value) is given by:

$$\begin{aligned}Fnx = \; & P_{pre} \cdot f(T_{w1} + T_{off} + nx) + \\ & P_{w1} \cdot \{f(T_{off}+nx) - f(T_{w1}+T_{off}+nx)\} + \\ & P_{LB} \cdot \{f(nx) - f(T_{off}+nx)\} + \\ & P_{pre} \cdot \{1-(nx)\}\end{aligned}$$

A condition for making the disk temperature after the heat shut off process constant is F0=F1x=F2x= . . . =Fnx. More specifically, if Fnx=F(n+1)x (n=0, 1, 2, . . . ), the following formula (3) is established:

(formula 3)
$$\begin{aligned}& P_{pre} \cdot [f\{T_{w1}+T_{off}+(n+1)x\} - f(T_{w1}+T_{off}+nx) - \\ & f\{(n+1)x\} + f(nx)] + P_{w1} \cdot [f\{T_{off}+(n+1)x\} - \\ & f\{T_{w1}+T_{off}+(n+1)x\} - f(T_{off}+nx) + \\ & f(T_{w1}+T_{off}+nx)] + P_{LB} \cdot [f\{(n+1)x\} - \\ & f\{T_{off}+(n+1)x\} - f(nx) + f(T_{off}+nx)] = 0\end{aligned}$$

Formula 3 cannot be solved any further. Thus, assume that f(t) satisfies the following condition:

(formula 4)
$$f(a)\cdot f(b)=f(a+b),\ f(a)/f(b)=f(a-b)$$

Then, formula 3 can be factorized as follows:

$$f(nx)\{f(x)-1\}[f(T_{off})\cdot\{(P_{w1}-P_{LB})-(P_{w1}-P_{pre})\cdot f(T_{w1})\}-(P_{pre}-P_{LB})]=0$$
(formula 5)

It is apparent that $f(x)-1\neq 0$ is satisfied. Therefore, if $f(T_{off})\cdot\{(P_{w1}-P_{LB})-(P_{w1}-P_{pre})\cdot f(T_{w1})\}-(P_{pre}-P_{LB})=0$ in formula 5, a condition for establishing Fnx=F(n+1)x for an arbitrary n is determined. That is, this condition is:

$f(T_{off})=(P_{pre}-P_{LB})/\{(P_{W1}-P_{LB})-(P_{W1}-P_{pre})\cdot f(T_{W1})\}$  (formula 6)

Formula 6 becomes equal to a formula obtained by assuming $\exp(-t/\tau)=f(t)$ in heat shut off condition formula 1.

As described above, when the thermal response function $f(t)$ satisfies the condition given by formula 4, a condition for making the disk temperature constant after the heat shut off process can be determined.

When the thermal response function $f(t)$ does not satisfy the condition given by formula 4, since the condition for making the disk temperature constant cannot be determined, a condition for minimizing an average FA, given by the following formula, of F0 to Fnx is searched:

$$\sum_{i=0}^{n} \{(Fix - FA)^2\}$$

The present invention will be described in detail below by way of its examples. However, the present invention is not limited to these examples.

DETAILED DESCRIPTION OF THE PREFERRED EMBODIMENTS

Figure 1:
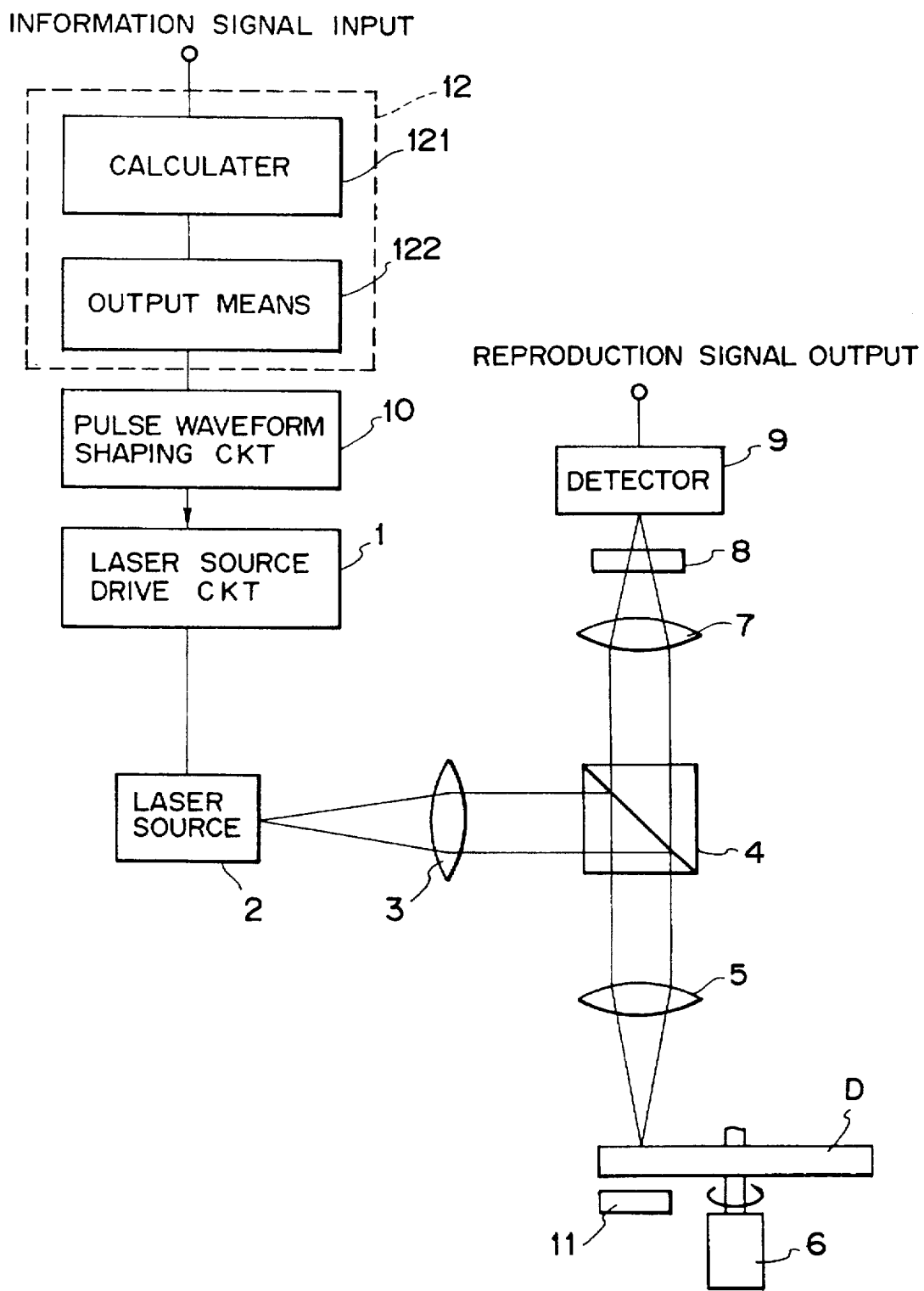
FIG. 1 is a diagram showing an arrangement of main part of a magnetooptical recording apparatus according to an embodiment of the present invention.

FIG. 1 is a diagram showing an arrangement of main part of a magnetooptical recording apparatus according to an embodiment of the present invention. This apparatus also serves as a reproduction apparatus, and mainly comprises a motor (rotation means 6) for rotating a magnetooptical recording medium D, a laser source 2, a laser source drive circuit 1 for pulse-modulating the laser beam intensity between high and low levels in accordance binary data to be recorded, a recording magnetic field applying means (permanent magnet 11), a pulse waveform shaping circuit 10, and a condition determination means 12. The pulse waveform shaping circuit 10 shapes a pulse waveform into a waveform shown in FIG. 2 (to be described later).

The condition determination means 12 comprises a calculation unit 121 for determining a combination of respective values ($P_{pre}$, $P_{W1}$, $P_{LB}$, $T_{W1}$, and $T_{off}$) on the basis of formula 2, and an output unit 122 for outputting the determined values. The calculation unit determines the respective values based on formula 2. The determined values are output from the output unit. The pulse waveform shaping circuit 10 shapes the pulse waveform on the basis of the output values.

As the medium D, a magnetooptical disk is set. The medium D is rotated by the rotation means 6, so that the linear velocity of tracks on the medium D has a predetermined value. A laser beam spot from the laser source 2 is radiated on a track under the servo control. That is, focusing and tracking servo devices (not shown) are operated. The laser beam emitted from the laser source 2 is pulse-modulated by the laser source drive circuit 1 in accordance with binary data to be recorded. The beam emitted from the laser source 2 is collimated via a collimator lens 3, and is reflected by a beam splitter 4. The reflected beam is focused by an objective lens 5, and forms a focal point on the medium D. Recording is thus basically completed.

In a reproduction mode, a DC-ON laser beam, which is not intensity-modulated, is radiated onto the medium D in the same manner as in a recording mode. Light reflected by the medium is caused to become incident on the beam splitter 4 via the objective lens 5. Light transmitted through the beam splitter 4 is focused by a focusing lens 7, and is caused to become incident on a detector 9. The state of rotation of the plane of polarization is converted into a change in light intensity via an analyzer 8 arranged between the focusing lens 7 and the detector 9. Thus, data recorded on the medium D, which is read as rotation of the plane of polarization, is converted into a change in light intensity. The change in light intensity is converted into electrical signal levels by the detector 9. This is the reproduction process.

Figure 2:
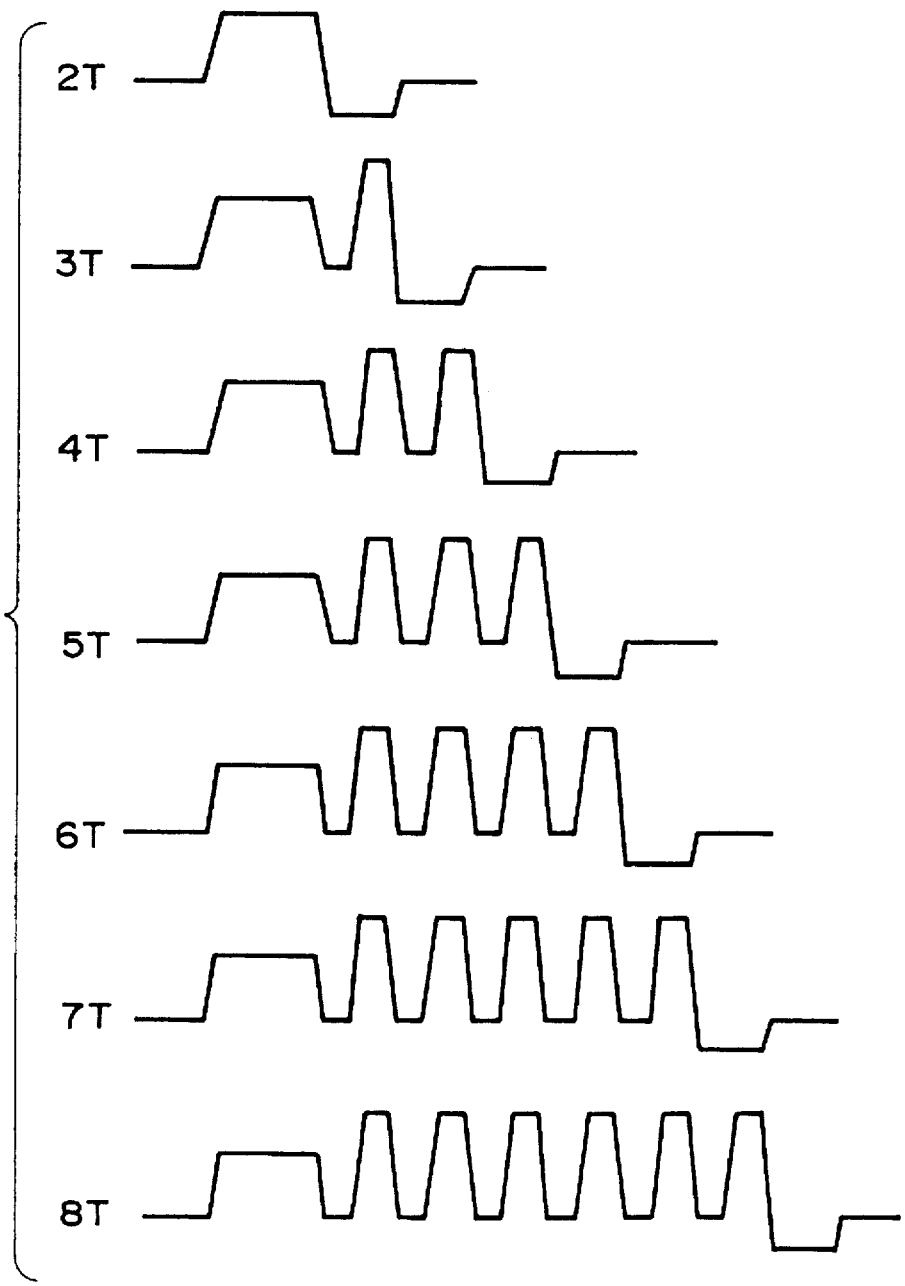
FIG. 2 is a waveform chart of a laser beam intensity when 2T to 8T marks used in the embodiment shown in FIG. 1 are formed.
Figure 3:
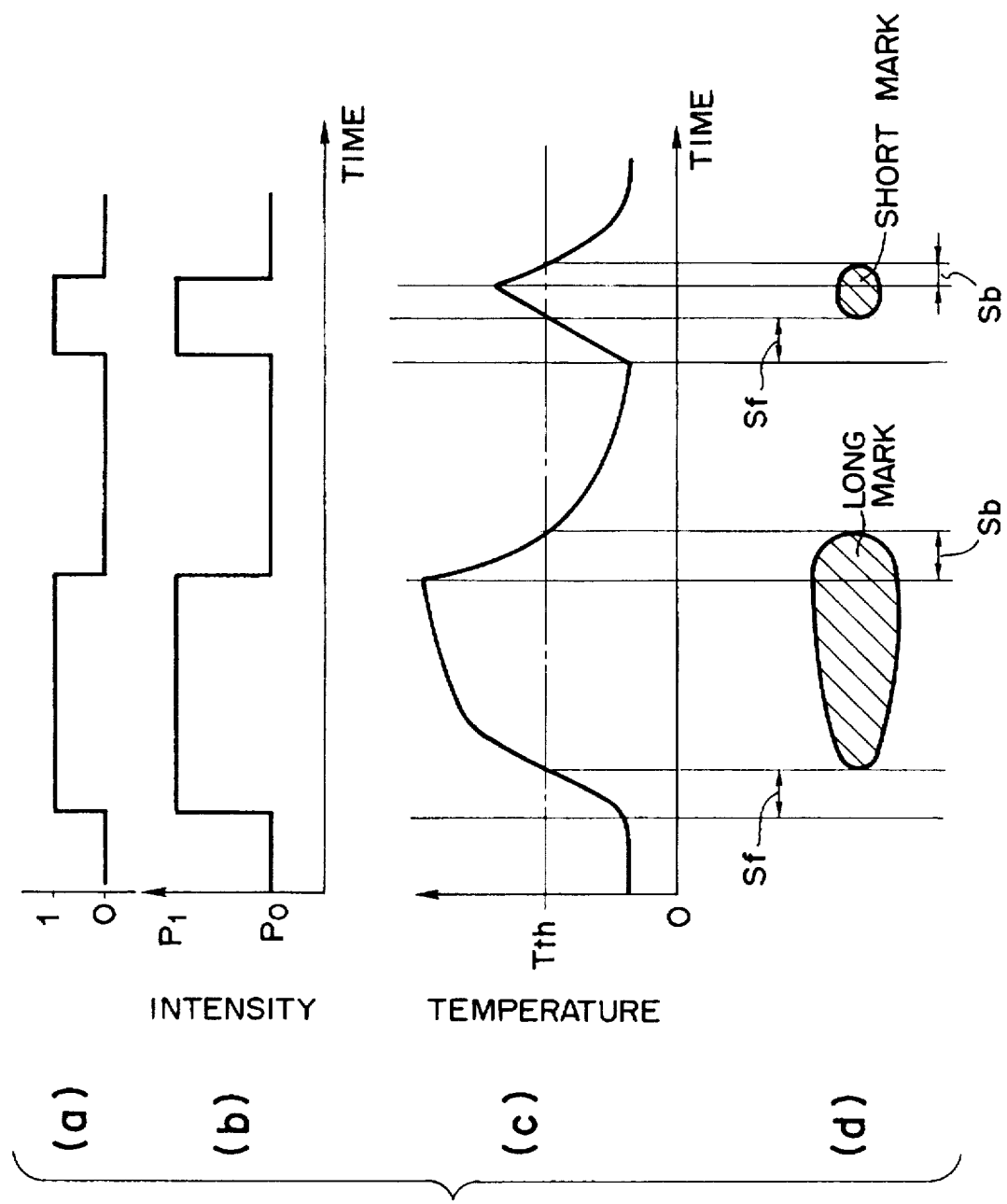
FIG. 3 includes an example of a pattern (waveform) of a data signal to be recorded, a chart (a chart of electric power to be input to a laser source) showing a light-emission intensity $P_1$ and a light-off intensity $P_0$ of the laser beam at that time, a temperature profile (elevated temperature profile) of the disk at that time, and an explanatory view showing the relationship of marks to be formed
Figure 4:
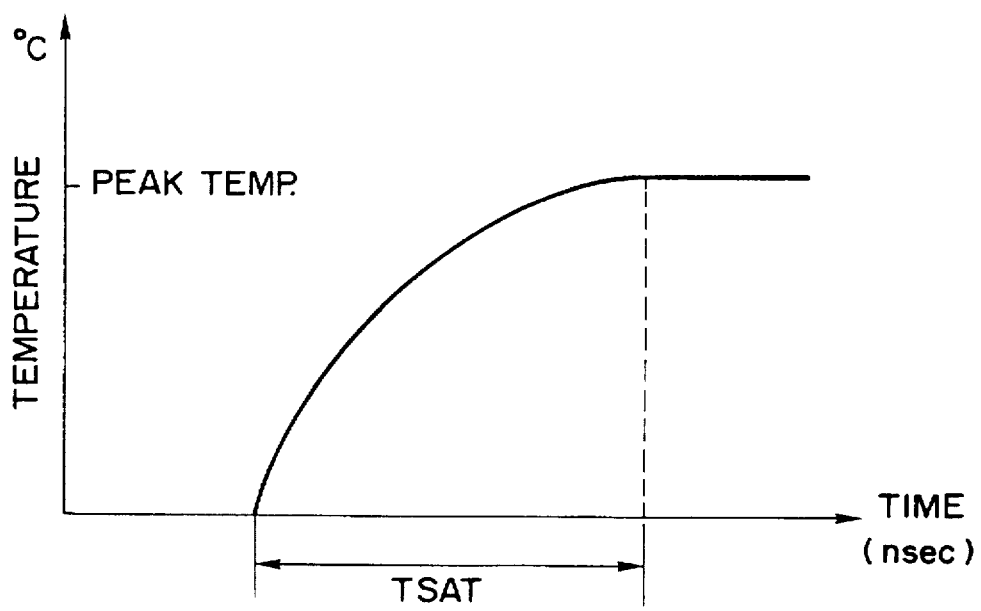
FIG. 4 is a graph of the temperature profile showing a time ($t_{sat}$) required until the temperature is saturated.
Figure 5:
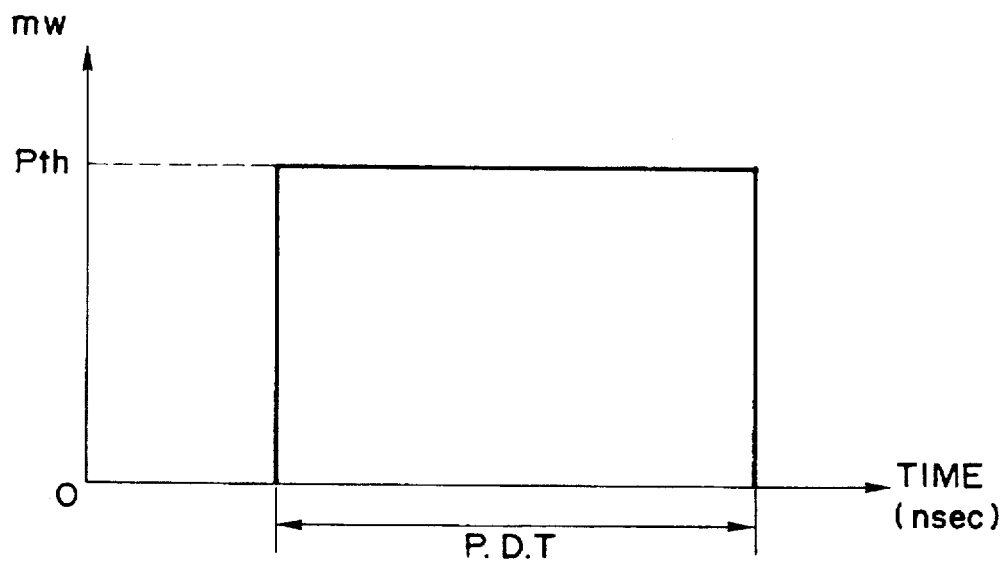
FIG. 5 is a waveform chart for explaining pulse duration time (P.D.T.)
Figure 6:
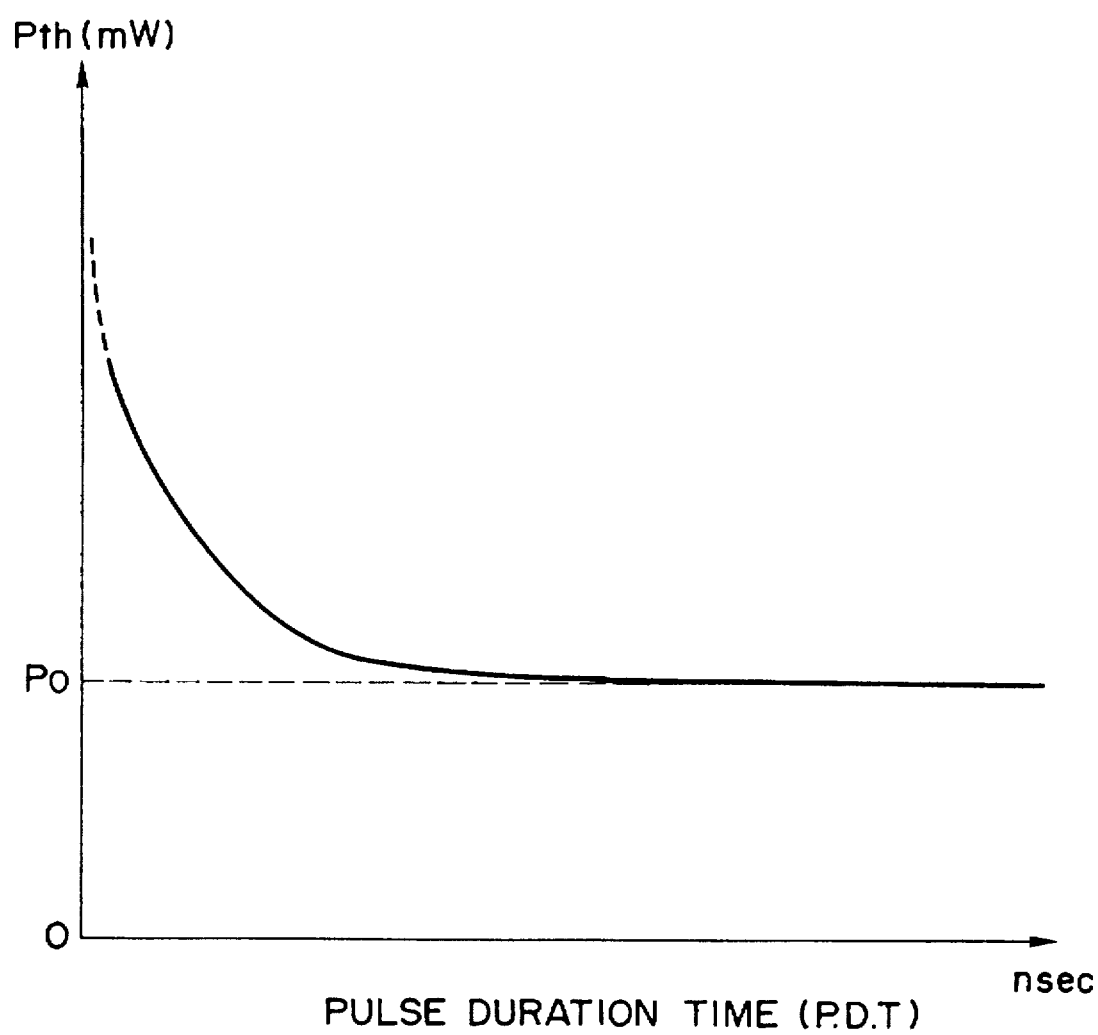
FIG. 6 is a graph wherein data are plotted while the ordinate represents $P_{th}$, and the abscissa represents P.D.T.
Figure 7:
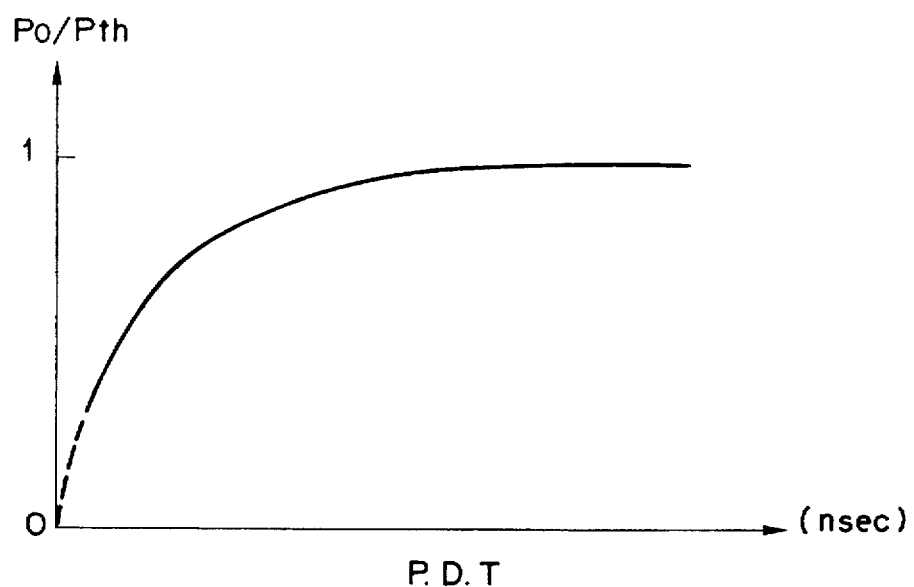
FIG. 7 is a graph wherein data are plotted while the ordinate represents $P_0/P_{th}$, and the abscissa represents P.D.T. (showing the elevated temperature profile of the disk)
Figure 8:
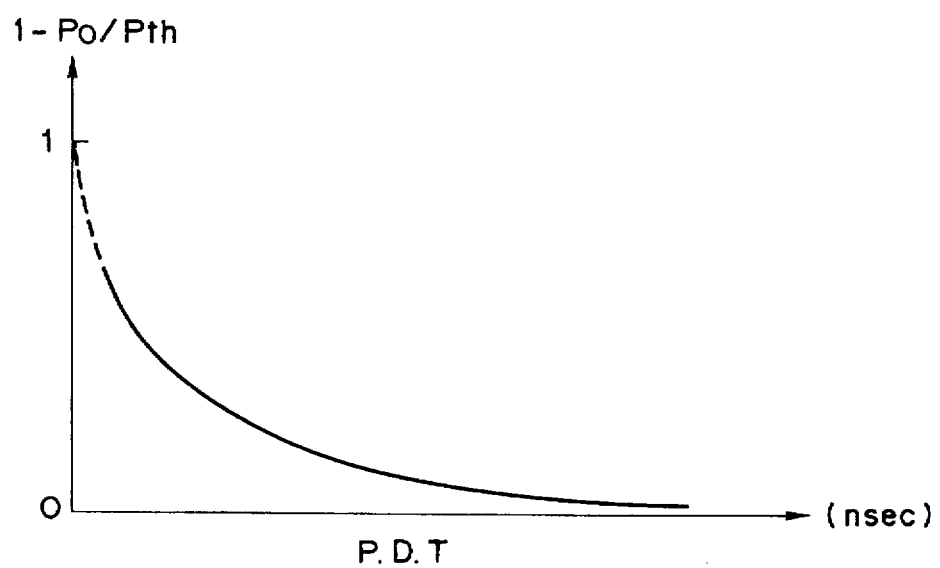
FIG. 8 is a graph wherein data are plotted while the ordinate represents $1-P_0/P_{th}$, and the abscissa represents P.D.T. (showing the decreased temperature profile of the disk)
Figure 9:
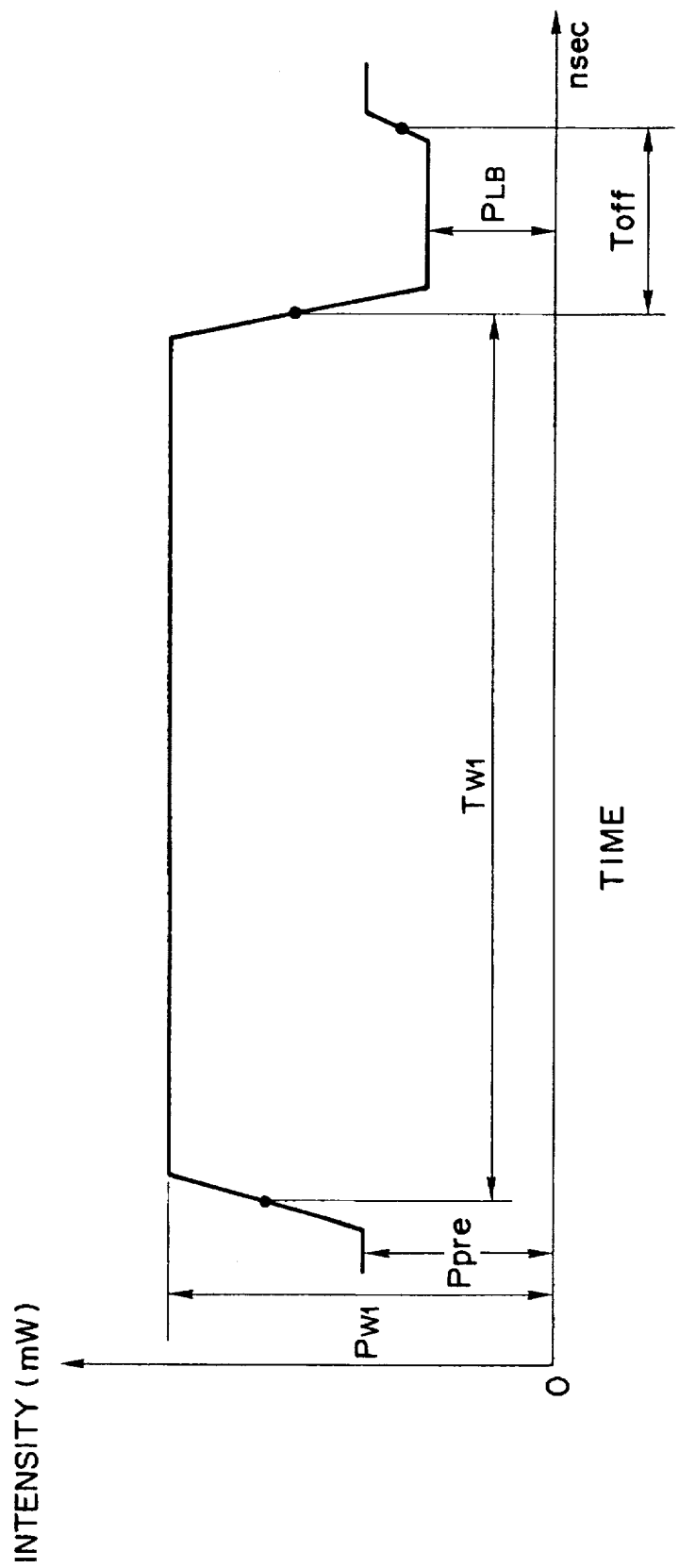
FIG. 9 is a waveform chart of a laser beam intensity when one mark is formed using a heat shut off method.
Figure 10:
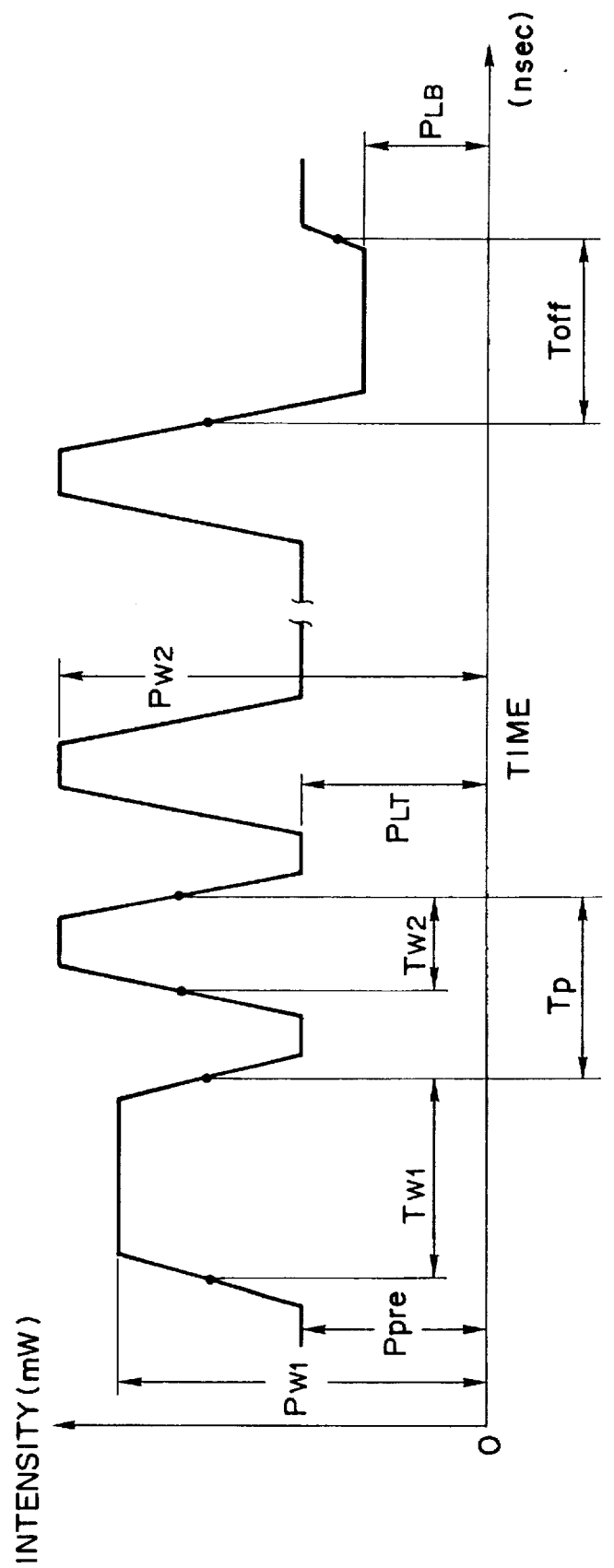
FIG. 10 is a waveform chart of a laser beam intensity when one mark is formed using the heat shut off method and a pulse train method.
Figure 11:
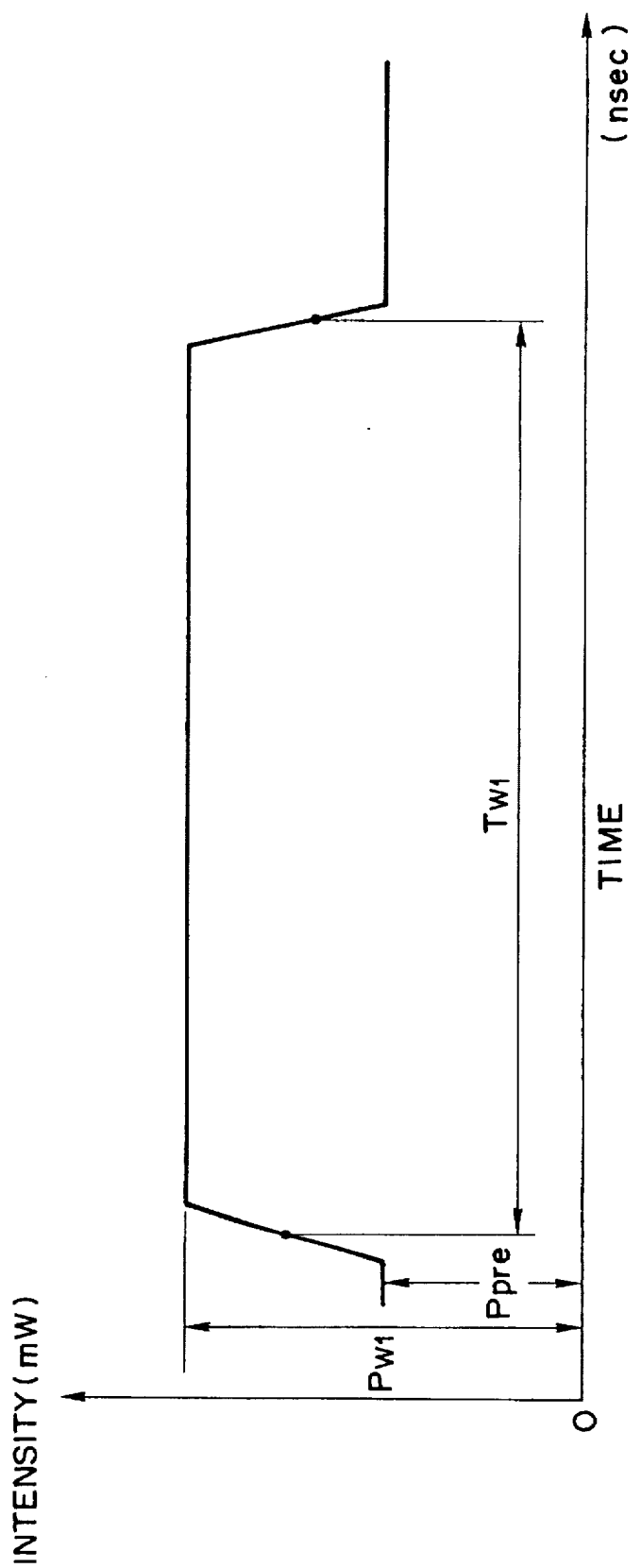
FIG. 11 is a waveform chart of a laser beam intensity when one mark is formed by a conventional method.
Figure 12:
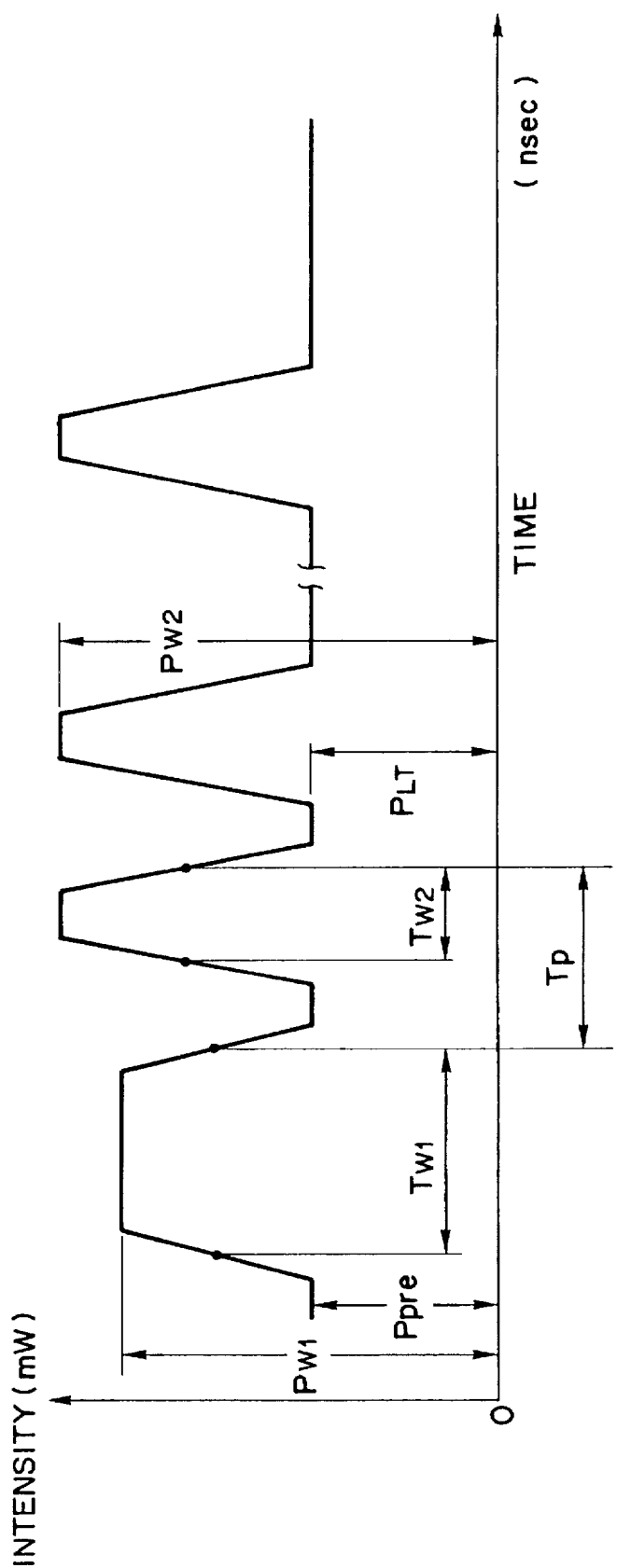
FIG. 12 is a waveform chart of a laser beam intensity when one mark is formed by the pulse train method.
Figure 13:
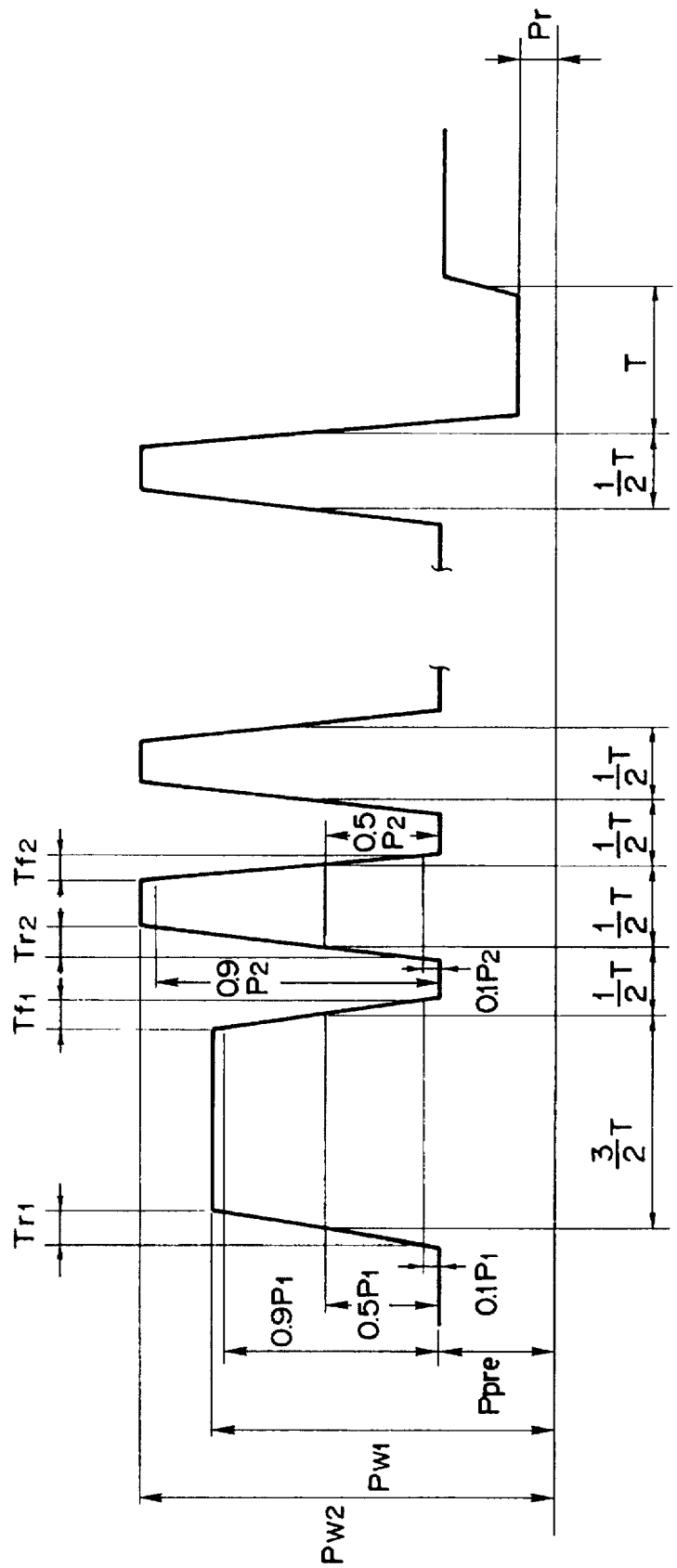
FIG. 13 is a waveform chart described in STANDARD ECMA/TC31/92/36 3rd Draft Proposal, p. 87.
Figure 14:
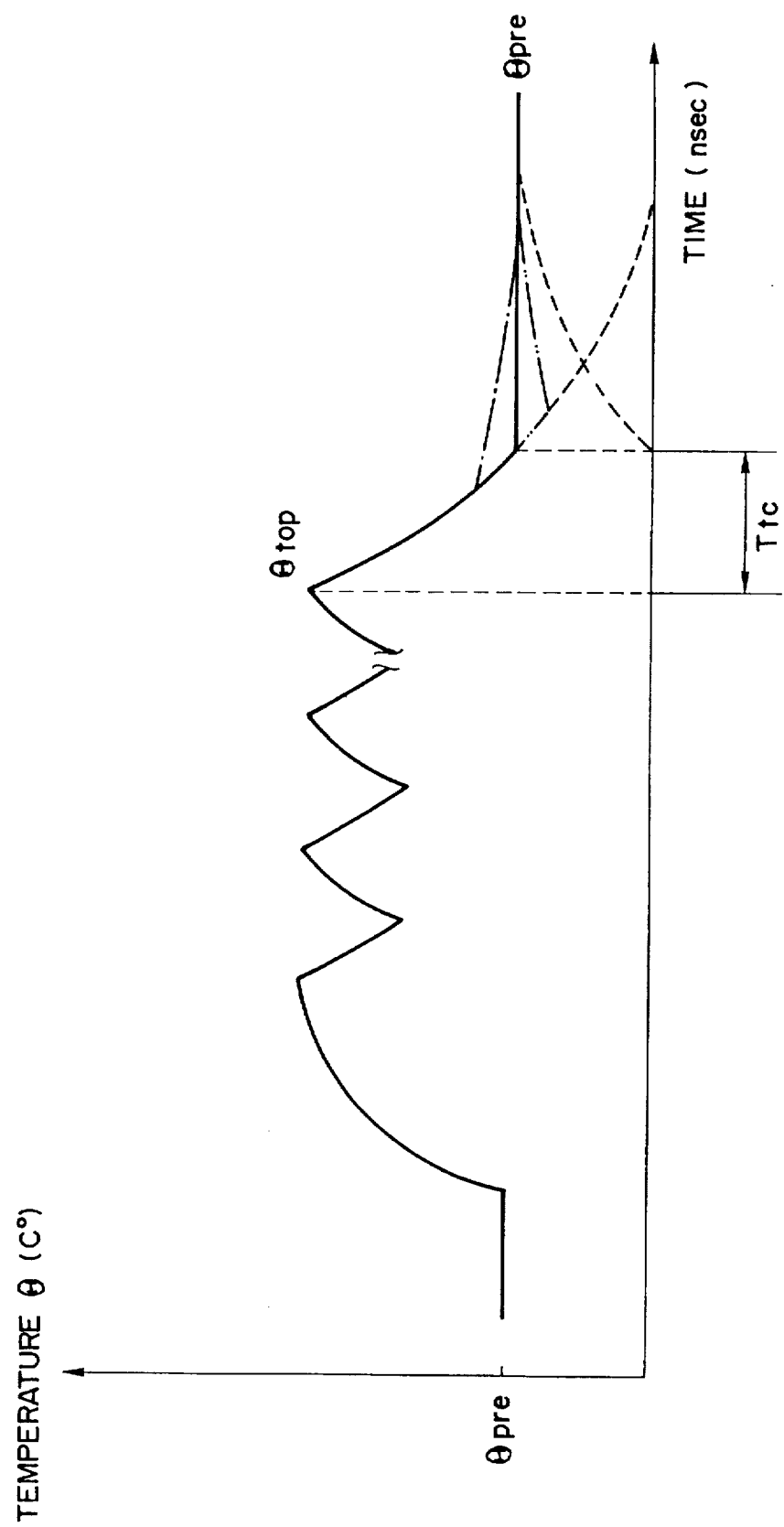
FIG. 14 is a graph of a change in temperature at the spot center of the laser beam or a change in peak temperature as time elapses when a mark is formed by the pulse train method and the heat shut off method.

In the above-mentioned apparatus, a magnetooptical disk having $\tau=55$ nsec (V=11.3 m/sec) measured by the above-mentioned measurement method of $\tau$ was provided. After the entire surface of the disk was initialized, the magnetooptical disk was rotated at a measurement linear velocity V=11.3 m/sec, and an NRZI mark length recording random signal of ⅔ one seven R.L.L., 0.56 μm/bit, T (write clock period)=33 nsec was recorded on the disk using a recording/reproduction laser beam, which had N.A.=0.55, a wavelength=830 nm, and laser pulse rising and falling times of about 5 nsec under the following conditions. As a pulse waveform, the pulse train method and the heat shut off method, as shown in FIG. 2, were adopted. The number of types of marks was 7, i.e., 2T to 8T marks. FIG. 2 is a waveform chart of the laser beam intensity when 2T to 8T marks are formed. An nT mark is a mark with which the width of a reproduction pulse becomes n times (e.g., twice for the 2T mark) of the clock period T when the recorded mark is reproduced.

The pulse train conditions were $P_{W1}=11$ mW, $T_p=33$ nsec (=T), $T_{W1}=50$ nsec (=T×3/2), $P_{LT}=P_{pre}$, the half-width $T_{W2}=16.5$ nsec (=T×1/2) of the following pulse, and $P_{W2}=11.2$ mW (a value for minimizing recording data pattern dependency of the mark formation end position, i.e., the mark trailing edge position).

[Example 1]

$P_{LB}$ and $T_{off}$ were fixed to $P_{LB}=P_r=1.5$ mW, and $T_{off}=33$ nsec (=T).

Thereafter, recording was performed while variously changing $P_{pre}$, recorded data were reproduced at a reproduction laser beam intensity $P_r=1.5$ mW, and "recording data pattern dependency of the mark formation start position, i.e., the mark leading edge position" was measured. As a result, the dependency was minimized when $P_{pre}=5.5$ mW.

[Example 2]

$P_{LB}$ and $T_{off}$ were fixed to $P_{LB}=P_r=0$ mW, and $T_{off}=33$ nsec (=T).

Thereafter, recording was performed while variously changing $P_{pre}$, recorded data were reproduced at a reproduction laser beam intensity $P_r=1.5$ mW, and "recording data pattern dependency of the mark formation start position, i.e., the mark leading edge position" was measured. As a result, the dependency was minimized when $P_{pre}=4.6$ mW.

[Example 3]

$P_{LB}$ and $P_{pre}$ were fixed to $P_{LB}=P_r=1.5$ mW, and $P_{pre}=4.2$ mW.

Thereafter, recording was performed while variously changing $T_{off}$, recorded data were reproduced at a reproduction laser beam intensity $P_r=1.5$ mW, and "recording data pattern dependency of the mark formation start position, i.e., the mark leading edge position" was measured. As a result, the dependency was minimized when $T_{off}=50$ nsec.

[Example 4]

$P_{LB}$ and $P_{pre}$ were fixed to $P_{LB}=P_r=1.5$ mW, and $P_{pre}=4.2$ mW.

When $T_{off}$ was calculated from formula 2, $T_{off}=50$ nsec was obtained. This value was equal to a value corresponding to minimum "recording data pattern dependency of the mark formation start position, i.e., the mark leading edge position", i.e., the value obtained in [Example 3].

[Comparative Example]

Recording and reproduction were performed under substantially the same conditions as in conditions in [Example 3], except that $T_{off}=33$ nsec (=T). As a result, the leading edge position of the next mark after a 2T interval (an interval between the two adjacent marks) was shifted forward by about 1 nsec as compared to the leading edge positions of the next marks after 3T to 8T intervals. The "recording data pattern dependency of the mark formation start position, i.e., the mark leading edge position" still remained.

It is assumed that $T_{tc}$ in this case is larger than the 2T interval.

As described above, according to the present invention, since a heat shut off condition optimal for an optical disk can be obtained, when optical recording is performed using this condition, "recording data pattern dependency of the mark formation start position, i.e., the mark leading edge position" on any optical disk can be eliminated. As a result, high-density recording can always be performed, and a decrease in identifiability of data can be prevented all the time.

What is claimed is:

1. In an optical recording method wherein recording is conducted by radiating a laser beam onto an optical recording medium at an intensity $P_{pre}$ for maintaining a pre-heat state, in which a temperature of the medium surface becomes a predetermined temperature $\Theta_{pre}$, raising the laser beam intensity to an intensity $P_{W1}$ higher than $P_{pre}$ so as to form a mark on the medium surface, after the intensity $P_{W1}$ is maintained for a time $T_{W1}$, reducing the laser beam intensity to an intensity $P_{LB}$ lower than $P_{pre}$, and after an elapse of a time $T_{off}$ raising the laser beam intensity to $P_{pre}$ preparatory to forming a next mark, the improvement comprising:
determining the respective values as a combination for satisfying the following formula:

$$T_{off} = \tau \times \ln \left[ \{(P_{W1} - P_{LB}) - (P_{W1} - P_{pre}) \times \exp(-T_{W1}/\tau)\} \div (P_{pre} - P_{LB}) \right]$$

where $\tau$ is a thermal time constant of said optical recording medium.

2. A method according to claim 1, wherein the intensity $P_{LB}$ is set to be zero.

3. A method according to claim 1, wherein the time $T_{off}$ is set to be equal to or close to a value m/n times (m and n are natural numbers) of a write clock period T.

4. An optical recording apparatus comprising:
a laser source for emitting a laser beam;
radiation means for radiating the laser beam onto an optical recording medium;
moving means for changing a radiation position of the laser beam on said medium;
modulation means operative in a recording mode for raising an intensity of the laser beam to be radiated onto said medium from an intensity $P_{pre}$ for maintaining a pre-heat state, in which the temperature of the medium surface becomes a predetermined temperature $\Theta_{pre}$, to an intensity $P_{W1}$ higher than $P_{pre}$ so as to form a mark, reducing the intensity to an intensity $P_{LB}$ lower than $P_{pre}$ after the intensity $P_{W1}$ is maintained for a time $T_{W1}$, and raising the intensity to $P_{pre}$ after an elapse of a time $T_{off}$ preparatory to forming a next mark; and
condition determination means for determining the respective values as a combination for satisfying the following formula:

$$T_{off} = \tau \times \ln \left[ \{(P_{W1} - P_{LB}) - (P_{W1} - P_{pre}) \times \exp(-T_{W1}/\tau)\} \div (P_{pre} - P_{LB}) \right]$$

where $\tau$ is a thermal time constant of said optical recording medium.

5. A method according to claim 4, wherein the intensity $P_{LB}$ is set to be zero.

6. A method according to claim 4, wherein the time $T_{off}$ is set to be equal to or close to a value m/n times (m and n are natural numbers) of a write clock period T.

7. A method of determining a heat shut off condition in an optical recording method wherein recording is conducted by radiating a laser beam onto an optical recording medium at an intensity $P_{pre}$ for maintaining a pre-heat state, in which a temperature of the medium surface becomes a predetermined temperature $\Theta_{pre}$, raising the laser beam intensity to an intensity $P_{W1}$ higher than $P_{pre}$ so as to form a mark on the medium surface, after the intensity $P_{W1}$ is maintained for a time $T_{W1}$, reducing the laser beam intensity to an intensity $P_{LB}$ lower than $P_{pre}$, and after an elapse of a time $T_{off}$, raising the laser beam intensity to $P_{pre}$ preparatory to forming a next mark, comprising the step of:

determining the respective values as a combination for satisfying the following formula:

$$T_{off} = \tau \times \ln[\{(P_{W1} - P_{LB}) - (P_{W1} - P_{pre}) \times \exp(-T_{W1}/\tau)\} + (P_{pre} - P_{LB})]$$

where $\tau$ is a thermal time constant of said optical recording medium.

8. A method according to claim 7, wherein the intensity $P_{LB}$ is set to be zero.

9. A method according to claim 7, wherein the time $T_{off}$ is set to be equal to or close to a value m/n times (m and n are natural numbers) of a write clock period T.

10. An apparatus for determining a heat shut off condition in an optical recording device wherein recording is conducted by radiating a laser beam onto an optical recording medium at an intensity $P_{pre}$ for maintaining a pre-heat state, in which a temperature of the medium surface becomes a predetermined temperature $\Theta_{pre}$, raising the laser beam intensity to an intensity $P_{W1}$ higher than $P_{pre}$ so as to form a mark on the medium surface, after the intensity $P_{W1}$ is maintained for a time $T_{W1}$, reducing the laser beam intensity to an intensity $P_{LB}$ lower than $P_{pre}$, and after an elapse of a time $T_{off}$, raising the laser beam intensity to $P_{pre}$ preparatory to forming a next mark, comprising:

a calculation unit for calculating the respective values as a combination for satisfying the following formula:

$$T_{off} = \tau \times \ln[\{(P_{W1} - P_{LB}) - (P_{W1} - P_{pre}) \times \exp(-T_{W1}/\tau)\} + (P_{pre} - P_{LB})]$$

where $\tau$ is a thermal time constant of said optical recording medium; and an output unit for outputting the values calculated b said calculation unit.

11. A method according to claim 10, wherein the intensity $P_{LB}$ is set to be zero.

12. A method according to claim 10, wherein the time $T_{off}$ is set to be equal to or close to a value m/n times (m and n are natural numbers) of a write clock period T.

* * * * *

UNITED STATES PATENT AND TRADEMARK OFFICE
CERTIFICATE OF CORRECTION

PATENT NO. : 5,487,059
DATED : January 23, 1996
INVENTOR(S) : SAITO et al.

It is certified that error appears in the above-indentified patent and that said Letters Patent is hereby corrected as shown below:

On the Title Page:
In item [30] "Foreign Application Priority Data" insert the following:
- -Sep. 20, 1993 [JP] Japan......................5-232632- -.

Signed and Sealed this

Twenty-seventh Day of March, 2001

*Attest:*

NICHOLAS P. GODICI

*Attesting Officer*    *Acting Director of the United States Patent and Trademark Office*